US011900870B2

(12) United States Patent
Kang et al.

(10) Patent No.: US 11,900,870 B2
(45) Date of Patent: Feb. 13, 2024

(54) DISPLAY DEVICE CONFIGURED TO SEQUENTIALLY APPLY A SENSING PULSE AND A SCAN PULSE

(71) Applicant: Samsung Display Co., Ltd., Yongin-si (KR)

(72) Inventors: Hyungryul Kang, Suwon-si (KR); Oh Jo Kwon, Suwon-si (KR); Yoshimura Hideo, Suwon-si (KR); Bong-Hyun You, Seongnam-si (KR); Jaekeun Lim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/510,120

(22) Filed: Oct. 25, 2021

(65) Prior Publication Data

US 2022/0044630 A1 Feb. 10, 2022

Related U.S. Application Data

(63) Continuation of application No. 16/538,597, filed on Aug. 12, 2019, now Pat. No. 11,158,248.

(30) Foreign Application Priority Data

Aug. 13, 2018 (KR) ........................ 10-2018-0094541

(51) Int. Cl.
*G09G 3/30* (2006.01)
*G09G 3/3225* (2016.01)
(Continued)

(52) U.S. Cl.
CPC ......... *G09G 3/3225* (2013.01); *G09G 3/3266* (2013.01); *G09G 3/3275* (2013.01); *G09G 2310/08* (2013.01)

(58) Field of Classification Search
CPC .. G09G 3/3225; G09G 3/3266; G09G 3/3275; G09G 2310/08
See application file for complete search history.

(56) References Cited

U.S. PATENT DOCUMENTS

2013/0147690 A1 6/2013 Kim et al.
2016/0005346 A1 1/2016 Kim
(Continued)

FOREIGN PATENT DOCUMENTS

KR 10-2014-0077789 A 6/2014
KR 10-2014-0078908 A 6/2014
(Continued)

OTHER PUBLICATIONS

EPO Extended Search Report dated Nov. 13, 2019, for corresponding European Patent Application No. 19191347.4 (9 pages).

*Primary Examiner* — Sanghyuk Park
(74) *Attorney, Agent, or Firm* — Lewis Roca Rothgerber Christie LLP

(57) ABSTRACT

A display device includes: a display panel including a plurality of pixels; a scan driver connected to the plurality of pixels through a plurality of scan lines; a data driver connected to the plurality of pixels through a plurality of data lines; an emission driver connected to the plurality of pixels through a plurality of emission control lines; a sensing circuit connected to the plurality of pixels through a plurality of sensing lines; and a controller configured to control the scan driver, the data driver, the emission driver and the sensing circuit, wherein, in an active period of each frame period, the scan driver sequentially applies a sensing pulse and a scan pulse to at least one scan line of the plurality of scan lines, and applies the scan pulse to remaining scan lines of the plurality of scan lines.

19 Claims, 16 Drawing Sheets

(51) Int. Cl.
*G09G 3/3266* (2016.01)
*G09G 3/3275* (2016.01)

(56) References Cited

U.S. PATENT DOCUMENTS

| | | | | |
|---|---|---|---|---|
| 2016/0111044 | A1 | 4/2016 | Kishi et al. | |
| 2017/0061870 | A1 | 3/2017 | Kang | |
| 2018/0130423 | A1 | 5/2018 | Kim et al. | |
| 2018/0158415 | A1* | 6/2018 | Chaji | G09G 3/3258 |
| 2019/0006452 | A1 | 1/2019 | Cho et al. | |
| 2019/0012948 | A1 | 1/2019 | Ohara et al. | |
| 2019/0035335 | A1 | 1/2019 | Kim et al. | |
| 2019/0043424 | A1 | 2/2019 | Wang et al. | |
| 2019/0066587 | A1 | 2/2019 | Han | |
| 2019/0156738 | A1 | 5/2019 | Ji et al. | |
| 2019/0197959 | A1* | 6/2019 | Noh | G09G 3/3266 |
| 2019/0378459 | A1* | 12/2019 | Kim | G09G 3/3291 |

FOREIGN PATENT DOCUMENTS

| | | | |
|---|---|---|---|
| KR | 10-2014-0083185 | A | 7/2014 |
| KR | 10-2016-0108668 | A | 9/2016 |
| WO | WO 2017/115713 | A1 | 7/2017 |

* cited by examiner

DISPLAY DEVICE CONFIGURED TO SEQUENTIALLY APPLY A SENSING PULSE AND A SCAN PULSE

CROSS-REFERENCE TO RELATED APPLICATIONS

This application is a continuation of U.S. patent application Ser. No. 16/538,597, filed Aug. 12, 2019, which claims priority to and the benefit of Korean Patent Application No. 10-2018-0094541, filed Aug. 13, 2018, the entire content of both of which is incorporated herein by reference.

BACKGROUND

1. Field

Aspects of some example embodiments of the present inventive concept relate to display devices.

2. Description of the Related Art

In a display device, such as an organic light emitting display device, driving transistors in respective pixels may have different hysteresis characteristics, or different voltage-current characteristics according to data voltages or stresses applied to gates of the characteristics in previous frame periods.

In order for the driving transistors to have substantially the same hysteresis characteristic, each pixel may include an additional initialization transistor that applies an initialization voltage to the gate of the driving transistor. However, this technique requires the additional initialization transistors, initialization lines, and/or an initialization power supply, and thus may not be suitable for a high resolution display device.

The above information disclosed in this Background section is only for enhancement of understanding of the background of the invention and therefore it may contain information that does not constitute prior art.

SUMMARY

Aspects of some example embodiments of the present inventive concept relate to display devices, and for example, to display devices performing sensing operations.

Some example embodiments provide a display device capable of compensating for hysteresis characteristics of driving transistors without additional initialization transistors, lines and/or power supply.

According to some example embodiments, there is provided a display device including a display panel including a plurality of pixels, a scan driver connected to the plurality of pixels through a plurality of scan lines, a data driver connected to the plurality of pixels through a plurality of data lines, an emission driver connected to the plurality of pixels through a plurality of emission control lines, a sensing circuit connected to the plurality of pixels through a plurality of sensing lines, and a controller configured to control the scan driver, the data driver, the emission driver and the sensing circuit. In an active period of each frame period, the scan driver sequentially applies a sensing pulse and a scan pulse to at least one scan line of the plurality of scan lines, and applies the scan pulse to remaining scan lines of the plurality of scan lines.

In example embodiments, a pulse width of the sensing pulse may be wider than a pulse width of the scan pulse.

In example embodiments, after the scan pulse is applied to a previous scan line that is directly previous to the at least one scan line among the plurality of scan lines, and before the scan pulse is applied to the at least one scan line, the scan driver may apply the sensing pulse to the at least one scan line.

In example embodiments, the controller may provide the scan driver with first and second clock signals having clock pulses at different time periods. When the scan driver applies the scan pulse to the previous scan line, a first one of the first and second clock signals may have a clock pulse having a first pulse width. When the scan driver applies the sensing pulse to the at least one scan line, a second one of the first and second clock signals may have a clock pulse having a second pulse width wider than the first pulse width. When the scan driver applies the scan pulse to the at least one scan line, the second one of the first and second clock signals may have a clock pulse having the first pulse width.

In example embodiments, the scan driver may apply the sensing pulse to different scan lines of the plurality of scan lines in different frame periods of a plurality of frame periods such that a sensing operation for all of the plurality of pixels is performed over the plurality of frame periods.

In example embodiments, the data driver may apply data voltages to the plurality of data lines when the scan driver outputs the scan pulse, and applies sensing voltages to the plurality of data lines when the scan driver outputs the sensing pulse.

In example embodiments, the sensing circuit may detect hysteresis characteristics of driving transistors of the plurality of pixels by measuring sensing currents flowing through the plurality of pixels connected to the at least one scan line based on the sensing voltages.

In example embodiments, the controller may adjust the data voltages for the plurality of pixels based on the hysteresis characteristics detected by the sensing circuit.

In example embodiments, the scan driver may include a plurality of stages that apply the scan pulse or the sensing pulse as a scan signal to the plurality of scan lines, respectively.

In example embodiments, each of the plurality of stages may include a first transistor configured to transfer a previous scan signal to a first node in response to a first clock signal, a second transistor configured to transfer a high gate voltage to a third node in response to a voltage of a second node, a third transistor configured to transfer a voltage of the third node to the first node in response to a second clock signal, a fourth transistor configured to transfer the first clock signal to the second node in response to a voltage of the first node, a fifth transistor configured to transfer a low gate voltage to the second node in response to the first clock signal, a sixth transistor configured to output the high gate voltage as the scan signal to a scan output node in response to the voltage of the second node, a seventh transistor configured to output the second clock signal as the scan signal to the scan output node in response to the voltage of the first node, a first capacitor connected between a line of the high gate voltage and the second node, and a second capacitor connected between the first node and the scan output node.

In example embodiments, each of the plurality of pixels may include a scan transistor having a gate connected to a corresponding one of the plurality of scan lines, a source connected to a corresponding one of the plurality of data lines, and a drain, a storage capacitor having a first electrode connected to the drain of the scan transistor, and a second electrode connected to a line of a first power supply voltage, a driving transistor having a gate connected to the drain of the scan transistor and the first electrode of the storage capacitor, a source, and a drain, an emission control transistor having a gate connected to a corresponding one of the plurality of emission control lines, a source connected to the line of the first power supply voltage, and a drain connected to the source of the driving transistor, an organic light emitting diode having an anode connected to the drain of the driving transistor, and a cathode connected to a line of a second power supply voltage, and a sensing transistor having a gate connected to the corresponding one of the plurality of scan lines, a source connected to the drain of the driving transistor, and a drain connected to a corresponding one of the plurality of sensing lines.

In example embodiments, while the sensing pulse is applied, the scan transistor, the sensing transistor and the emission control transistor may be turned on, the driving transistor may generate a sensing current based on a sensing voltage transferred through the scan transistor, and the sensing transistor may transfer the sensing current generated by the driving transistor to the corresponding one of the plurality of sensing lines.

In example embodiments, while the scan pulse is applied, the scan transistor and the sensing transistor may be turned on, the emission control transistor may be turned off, and the storage capacitor may store a data voltage transferred through the scan transistor.

In example embodiments, after the scan pulse is applied, the scan transistor and the sensing transistor may be turned off, the emission control transistor may be turned on, the driving transistor may generate a driving current based on the data voltage stored in the storage capacitor, and the organic light emitting diode may emit light based on the driving current generated by the driving transistor.

In example embodiments, in each frame period, the scan driver may apply the sensing pulse to one scan line per successive L scan lines among the plurality of scan lines, where L is an integer greater than 1.

In example embodiments, the scan driver may apply the sensing pulse to different scan lines among the L scan lines in different frame periods such that a sensing operation for all of the plurality of pixels is performed over L frame periods.

In example embodiments, the plurality of scan lines may be grouped into a plurality of blocks each including successive P scan lines, where P is an integer greater than 1, and, in each frame period, the scan driver may apply the sensing pulse to the P scan lines included in one of the plurality of blocks.

In example embodiments, the scan driver may apply the sensing pulse to different blocks of the plurality of blocks in different frame periods of a plurality of frame periods such that a sensing operation for all of the plurality of pixels is performed over the plurality of frame periods.

In example embodiments, the scan driver may apply the sensing pulse to the at least one scan line in a normal mode corresponding to a first refresh rate, and may apply the sensing pulse to all of the plurality of scan lines in a low frequency mode corresponding to a second refresh rate lower than the first refresh rate.

According to example embodiments, there is provided a display device including a display panel including a plurality of pixels, a scan driver connected to the plurality of pixels through a plurality of scan lines, a data driver connected to the plurality of pixels through a plurality of data lines, an emission driver connected to the plurality of pixels through a plurality of emission control lines, a sensing circuit connected to the plurality of pixels through a plurality of sensing lines, and a controller configured to control the scan driver, the data driver, the emission driver and the sensing circuit. A sensing operation for the plurality of pixels connected to a portion of the plurality of scan lines is performed in each frame period such that the sensing operation for all of the plurality of pixels is performed over a plurality of frame periods.

As described above, in the display device according to some example embodiments, the scan driver may sequentially apply the sensing pulse and the scan pulse to at least one scan line within the active period of each frame period, and thus hysteresis characteristics of the driving transistors can be sensed and compensated without additional initialization transistors, lines and/or power supply.

Further, in the display device according to some example embodiments, a sensing operation for the hysteresis characteristics of the driving transistors may be performed over the plurality of frame periods, and thus the sensing operation can be performed in real time even in a high resolution display device.

BRIEF DESCRIPTION OF THE DRAWINGS

Illustrative, non-limiting example embodiments will be more clearly understood from the following detailed description in conjunction with the accompanying drawings.

DETAILED DESCRIPTION

Figure 1:
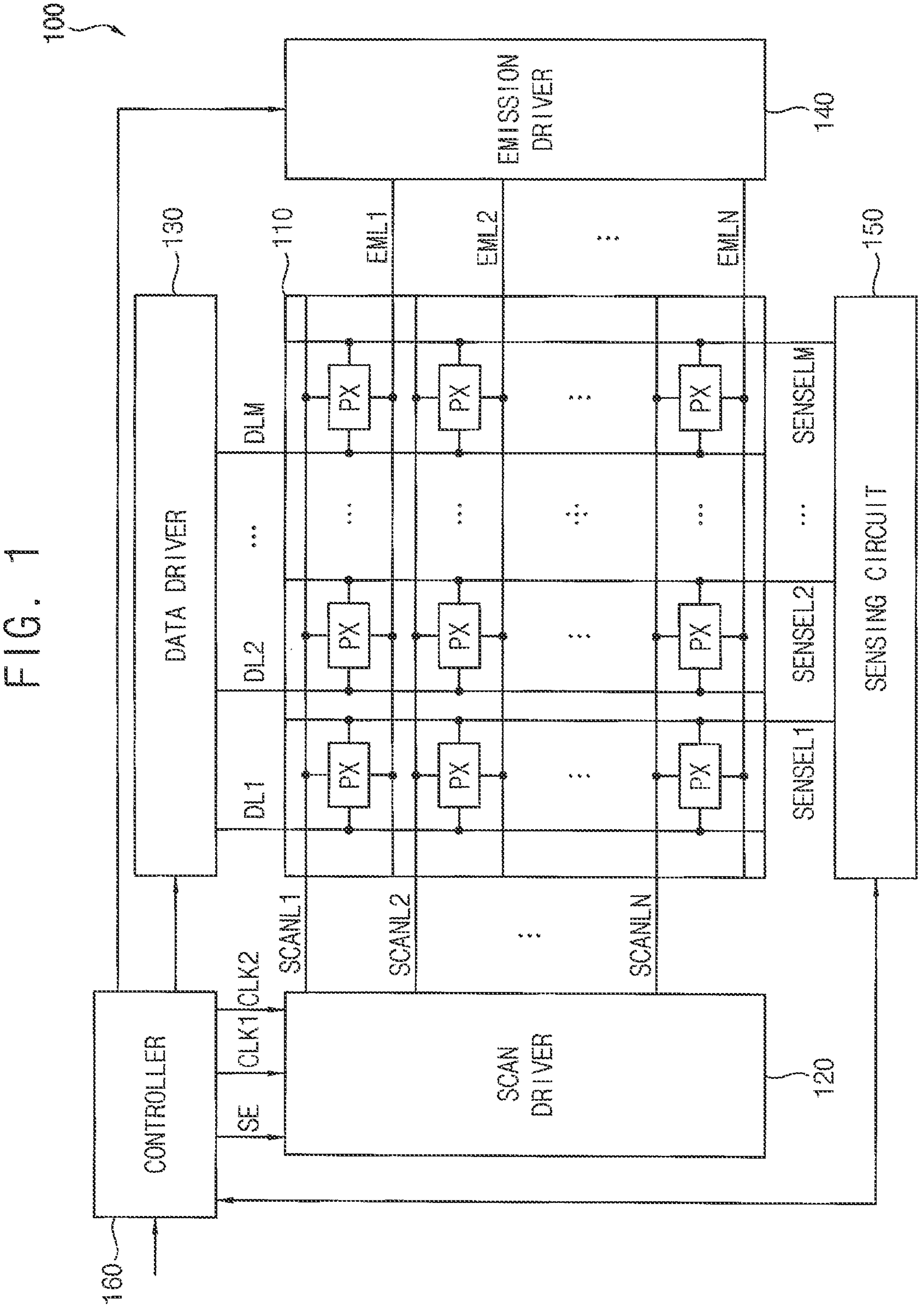
FIG. 1 is a block diagram illustrating a display device according to some example embodiments.

Aspects of some example embodiments are described more fully hereinafter with reference to the accompanying drawings. Like or similar reference numerals refer to like or similar elements throughout.

Figure 2:
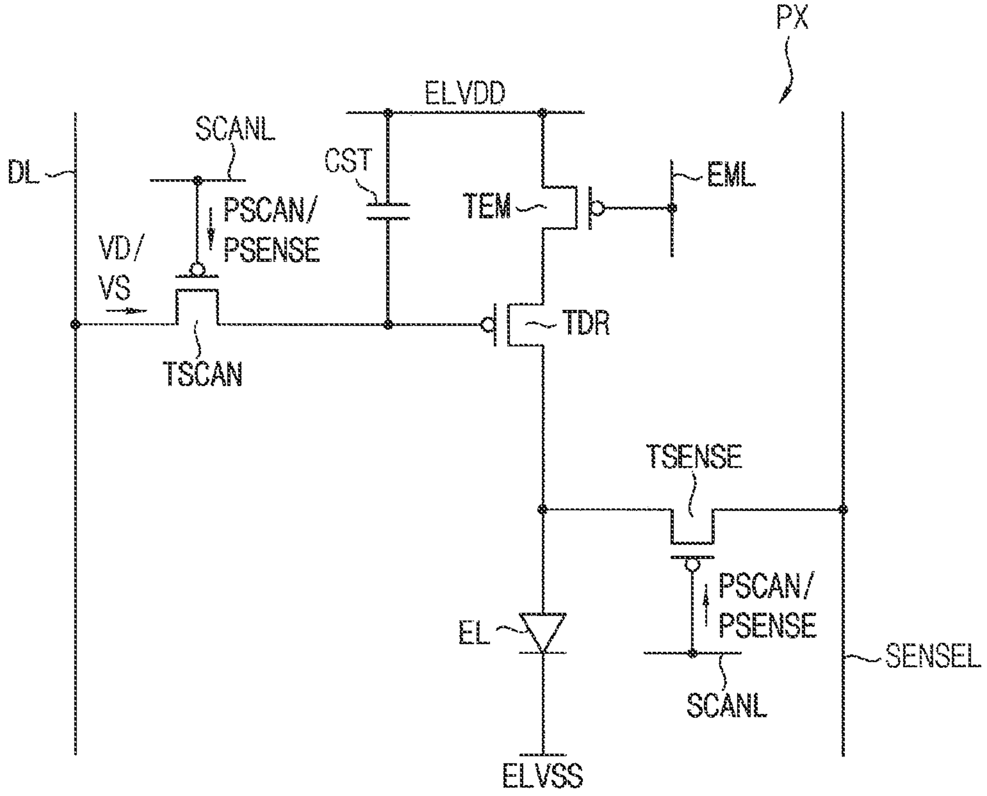
FIG. 2 is a circuit diagram illustrating a pixel included in a display device according to some example embodiments.
Figure 3:
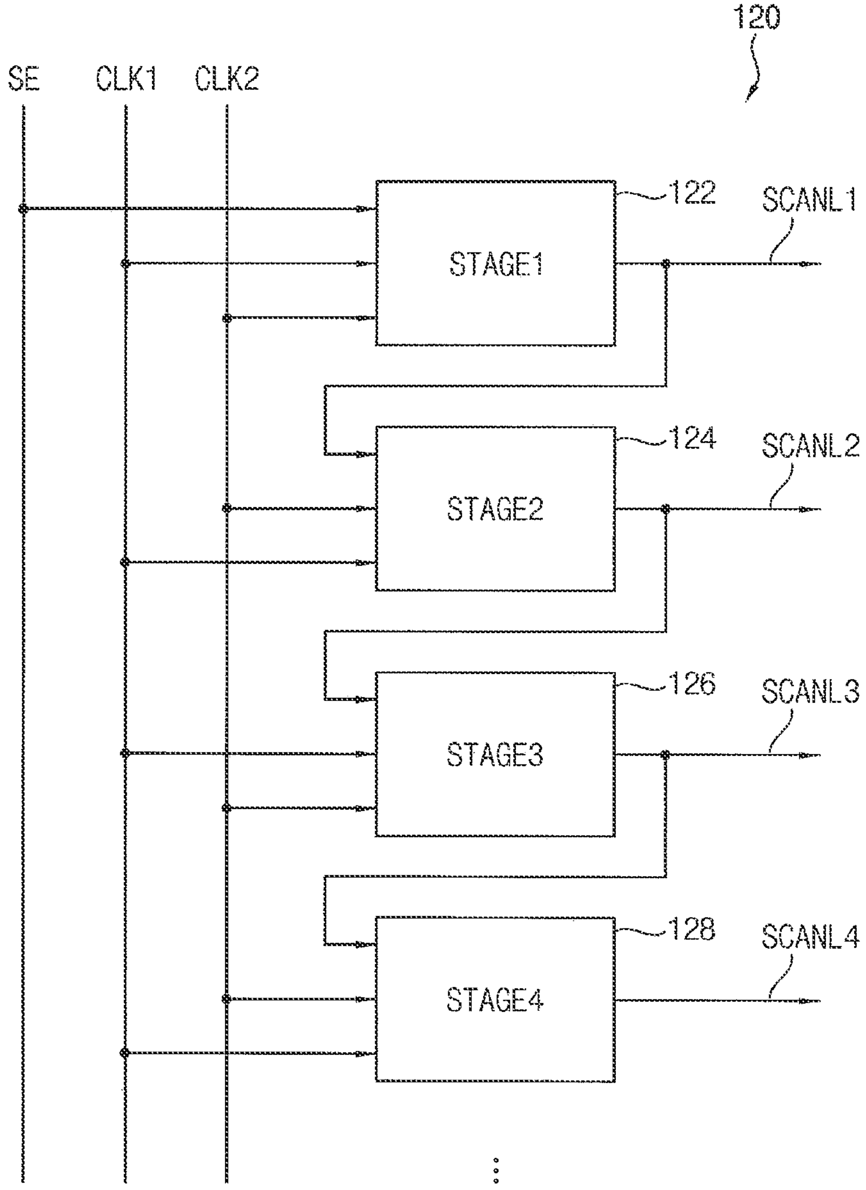
FIG. 3 is a block diagram illustrating an example of a scan driver according to some example embodiments.
Figure 4:
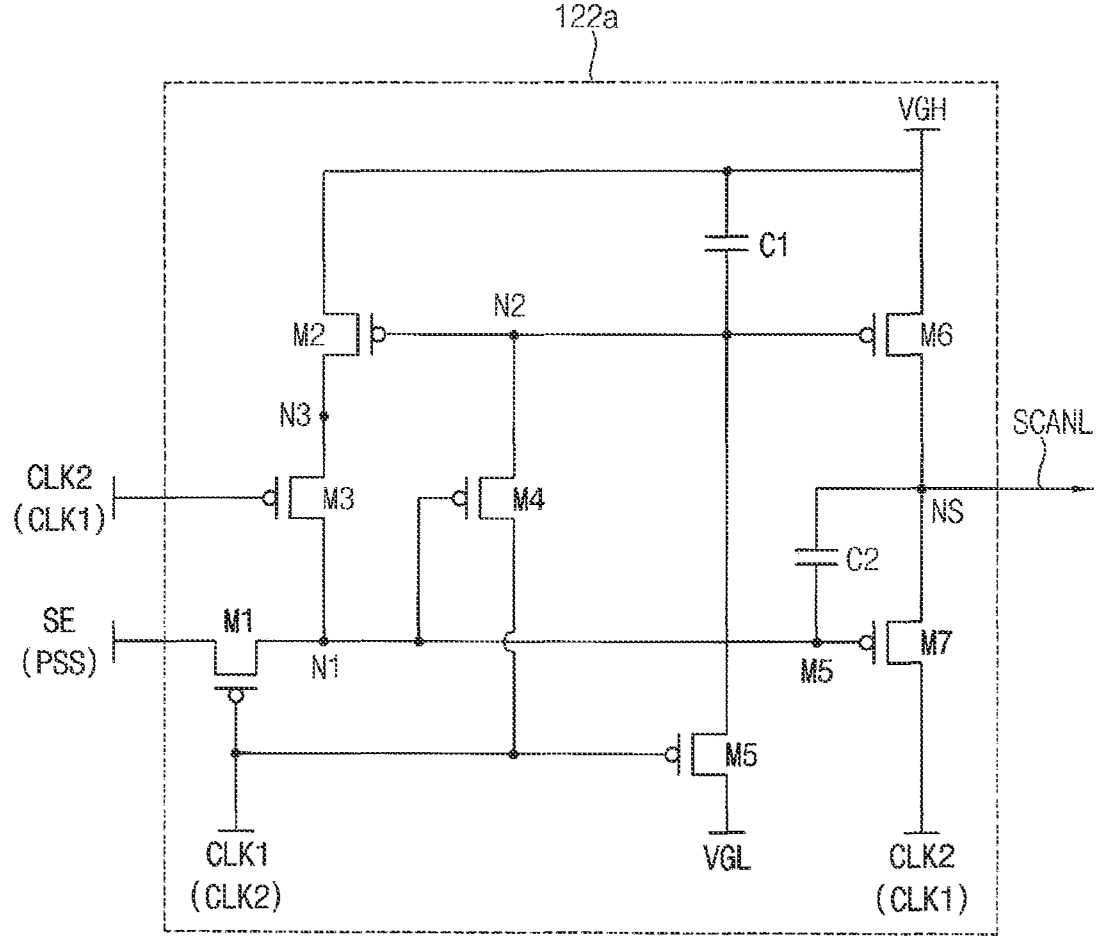
FIG. 4 is a circuit diagram illustrating an example of each stage included in a scan driver of FIG. 3.

FIG. 1 is a block diagram illustrating a display device according to some example embodiments, FIG. 2 is a circuit diagram illustrating a pixel included in a display device according to some example embodiments, FIG. 3 is a block diagram illustrating an example of a scan driver according to some example embodiments, and FIG. 4 is a circuit diagram illustrating an example of each stage included in a scan driver of FIG. 3.

Referring to FIG. 1, a display device 100 may include a display panel 110 including a plurality of pixels PX, a scan driver 120 connected to the plurality of pixels PX through a plurality of scan lines SCANL1, SCANL2, . . . , SCANLN, a data driver 130 connected to the plurality of pixels PX through a plurality of data lines DL1, DL2, . . . , DLM, an emission driver 140 connected to the plurality of pixels PX through a plurality of emission control lines EML1, EML2, . . . , EMLN, a sensing circuit 150 connected to the plurality of pixels PX through a plurality of sensing lines SENSEL1, SENSEL2, . . . , SENSELM, and a controller (e.g., a timing controller (TCON)) 160 that controls the scan driver 120, the data driver 130, the emission driver 140 and the sensing circuit 150.

The display panel 110 may include the plurality of scan lines SCANL1, SCANL2, . . . , SCANLN, the plurality of data lines DL1, DL2, DLM, the plurality of emission control lines EML1, EML2, . . . , EMLN, the plurality of sensing lines SENSEL1, SENSEL2, . . . , SENSELM, and the plurality of pixels PX connected thereto. In some example embodiments, the display panel 110 may be an organic light emitting diode (OLED) display panel where each pixel PX includes an OLED, but is not limited thereto. For example, the display panel 110 may be a liquid crystal display (LCD) panel, or the like.

In some example embodiments, as illustrated in FIG. 2, each pixel PX of the display panel 110 may include a scan transistor TSCAN that transfers a data voltage VD or a sensing voltage VS applied through a data line DL in response to a scan pulse PSCAN or a sensing pulse PSENSE applied through a scan line SCANL, a storage capacitor CST that stores the data voltage VD or the sensing voltage VS transferred by the scan transistor TSCAN, a driving transistor TDR that generates a driving current or a sensing current based on the data voltage VD or the sensing voltage VS stored in the storage capacitor CST, an emission control transistor TEM that controls a connection between the driving transistor TDR and a line of a first power supply voltage (e.g., a high power supply voltage) ELVDD, an OLED EL that emits light based on the driving current generated by the driving transistor TDR, and a sensing transistor TSENSE that transfers the sensing current generated by the driving transistor TDR to a sensing line SENSEL.

For example, the scan transistor TSCAN may have a gate connected to the scan line SCANL, a source connected to the data line DL, and a drain connected to a first electrode of the storage capacitor CST and a gate of the driving transistor TDR. The storage capacitor CST may have the first electrode connected to the drain of the scan transistor TSCAN, and a second electrode connected to the line of the first power supply voltage ELVDD. The driving transistor TDR may have a gate connected to the drain of the scan transistor TSCAN and the first electrode of the storage capacitor CST, a source connected to a drain of the emission control transistor TEM, and a drain connected to an anode of the OLED EL and a source of the sensing transistor TSENSE. The emission control transistor TEM may have a gate connected to an emission control line EML, a source connected to the line of the first power supply voltage ELVDD, and a drain connected to the source of the driving transistor TDR. The OLED EL may have the anode connected to the drain of the driving transistor TDR, and a cathode connected to a line of a second power supply voltage (e.g., a low power supply voltage) ELVSS. The sensing transistor TSENSE may have a gate connected to the scan line SCANL, a source connected to the drain of the driving transistor TDR, and a drain connected to the sensing line SENSEL.

The scan driver 120 may sequentially provide the scan pulse PSCAN to the plurality of pixels PX through the plurality of scan lines SCANL1, SCANL2, . . . , SCANLN on a row-by-row basis based on a control signal SE, CLK1 and CLK2 received from the controller 160. In some example embodiments, the control signal SE, CLK1 and CLK2 provided to the scan driver 120 may include, but not limited to, a scan enable signal SE, and first and second clock signals CLK1 and CLK2 having clock pulses at different time periods, for example the first and second clock signals CLK1 and CLK2 having opposite phases to each other.

In some example embodiments, as illustrated in FIG. 3, the scan driver 120 may include a plurality of stages 122, 124, 126 and 128 respectively applying a scan signal (e.g., the scan pulse PSCAN or the sensing pulse PSENSE) to the plurality of scan lines SCANL1, SCANL 2, SCANL3 and SCAN4 in response to the scan enable signal SE (or a previous scan signal), the first clock signal CLK1 and the second clock signal CLK2.

For example, as illustrated in FIG. 4, each stage 122*a* may include a first transistor M1 that transfers the scan enable signal SE or the previous scan signal PSS to a first node N1 in response to a first clock signal CLK1 (or the second clock signal CLK2 in case of an even-numbered stage 124 and 128), a second transistor M2 that transfers a high gate voltage VGH to a third node N3 in response to a voltage of a second node N2, a third transistor M3 that transfers a voltage of the third node N3 to the first node N1 in response to a second clock signal CLK2 (or the first clock signal CLK1 in case of an even-numbered stage 124 and 128), a fourth transistor M4 that transfers the first clock signal CLK1 (or the second clock signal CLK2 in case of an even-numbered stage 124 and 128) to the second node N2 in response to a voltage of the first node N1, a fifth transistor M5 that transfers a low gate voltage VGL to the second node N2 in response to the first clock signal CLK1 (or the second clock signal CLK2 in case of an even-numbered stage 124 and 128), a sixth transistor M6 that outputs the high gate voltage VGH as the scan signal (e.g., the scan pulse PSCAN or the sensing pulse PSENSE) to a scan output node NS connected to the scan line SCANL in response to the voltage of the second node N2, a seventh transistor M7 that outputs the second clock signal CLK2 (or the first clock signal CLK1 in case of an even-numbered stage 124 and 128) as the scan signal to the scan output node NS in response to the voltage of the first node N1, a first capacitor C1 connected between a line of the high gate voltage VGH and the second node N2, and a second capacitor C2 connected between the first node N1 and the scan output node NS. However, a configuration of each stage 122, 124, 126 and 128 of the scan driver 120 according to some example embodiments may not be limited to an example of FIG. 4.

In an active period of each frame period when the scan pulse PSCAN is sequentially provided to the plurality of scan lines SCANL1, SCANL2, . . . , SCANLN on a row-by-row basis, the scan driver 120 of the display device 100 according to some example embodiments may sequentially apply the sensing pulse PSENSE and the scan pulse PSCAN to a portion of the plurality of scan lines SCANL1, SCANL2, . . . , SCANLN, and may apply only the scan pulse PSCAN to the remaining of the plurality of scan lines SCANL1, SCANL2, . . . , SCANLN. For example, after the scan pulse PSCAN is applied to a previous scan line (e.g., SCANL1) that is directly previous to at least one scan line (e.g., SCANL2) among the plurality of scan lines SCANL1, SCANL2, . . . , SCANLN, and before the scan pulse PSCAN is applied to the at least one scan line (e.g., SCANL2), the scan driver 120 may apply the sensing pulse PSENSE to the at least one scan line (e.g., SCANL2).

In order that the scan driver 120 may apply the scan pulse PSCAN to the previous scan line (e.g., SCANL1), and then may apply the sensing pulse PSENSE and the scan pulse PSCAN to the at least one scan line (e.g., SCANL2), the controller 160 may provide the scan driver 120 with the first and second clock signals CLK1 and CLK2 of which one (e.g., CLK1) has a clock pulse having a first pulse width to provide the scan pulse PSCAN having the first pulse width to the previous scan line (e.g., SCANL1), then may provide the scan driver 120 with the first and second clock signals CLK1 and CLK2 of which the other (e.g., CLK2) has a clock pulse having a second pulse width wider than the first pulse width to provide the sensing pulse PSENSE having the second pulse width to the at least one scan line (e.g., SCANL2), and then may provide the scan driver 120 with the first and second clock signals CLK1 and CLK2 of which the other (e.g., CLK2) has a clock pulse having the first pulse width to provide the scan pulse PSCAN having the first pulse width to the at least one scan line (e.g., SCANL2). In some example embodiments, the second pulse width of the sensing pulse PSENSE may be wider than the first pulse width of the scan pulse PSCAN. For example, the first pulse width of the scan pulse PSCAN may correspond to 1 horizontal time (1H), and the second pulse width of the sensing pulse PSENSE may correspond to, but not limited to, few H, few tens H or few hundreds H.

The data driver 130 may provide the data voltages VD or the sensing voltages VS to the plurality of pixels PX based on a control signal and image data received from the controller 160. In some example embodiments, the control signal provided to the data driver 130 may include, but not limited to, a horizontal start signal and a load signal. In some example embodiments, the data driver 130 may apply the data voltages VD to the plurality of data lines DL1, DL2, . . . , DLM when the scan driver 120 outputs the scan pulse PSCAN, and may apply the sensing voltages VS to the plurality of data lines DL1, DL2, . . . , DLM when the scan driver 120 outputs the sensing pulse PSENSE. Here, the data voltages VD may be voltages corresponding to image data provided from an external host (e.g., a graphic processing unit (GPU) or a graphic card) to the controller 160, and the sensing voltages VS may be a data voltage corresponding to a gray level at which a sensing operation for the driving transistors TDR of the plurality of pixels PX is required.

The emission driver 140 may provide emission control signals to the plurality of pixels PX based on a control signal received from the controller 160. In some example embodiments, the emission control signals may be sequentially applied to the plurality of pixels PX on a row-by-row basis. For example, directly after the scan pulse PSCAN is applied to a scan line (e.g., SCANL1) in synchronization with a horizontal synchronization signal, the emission control signal of a emission control line (e.g., EML1) corresponding to the scan line (e.g., SCANL1) may be applied to the emission control line (e.g., EML1) in synchronization with the next horizontal synchronization signal.

While the scan driver 120 applies the sensing pulse PSENSE to at least one scan line, the sensing circuit 150 may detect hysteresis characteristics of the driving transistors TDR of the plurality of pixels PX by measuring sensing currents flowing through the plurality of pixels PX connected to the at least one scan line based on the sensing voltages VS, or the sensing currents generated by the driving transistors TDR of the plurality of pixels PX connected to the at least one scan line through the plurality of sensing lines SENSEL1, SENSEL2, . . . , SENSELM. For example, a first driving transistor TDR of a first pixel PX that continuously receives a data voltage corresponding to the highest gray level in previous frame periods, or a white data voltage and a second driving transistor TDR of a second pixel PX that continuously receives a data voltage corresponding to the lowest gray level in the previous frame periods, or a black data voltage may generate different driving currents even if the same data voltage corresponding to the same gray level is received in a current frame period. That is, the driving transistors TDR of the plurality of pixels PX may have different voltage-current characteristics (or different hysteresis characteristics) according to an amount of stress in previous frame periods. The sensing circuit 150 may detect these hysteresis characteristics of the driving transistors TDR of the plurality of pixels PX by measuring the sensing currents (or driving currents generated in response to the sensing voltages VS) generated by the driving transistors TDR when the sensing voltages VS (e.g., the same data voltage corresponding to the same gray level at which the sensing operation is required) are applied. In some example embodiments, the sensing circuit 150 may include, but not limited to, an analog-to-digital converter (ADC) that converts the sensing currents or analog voltages corresponding to the sensing currents into digital values.

The controller 160 may receive information about the hysteresis characteristics of the driving transistors TDR of the plurality of pixels PX from the sensing circuit 150, may adjust the image data based on the hysteresis characteristics such that the driving transistors TDR may generate substantially the same driving current at the same gray level, and may provide the adjusted image data to the data driver 130. Based on the adjusted image data, the data driver 130 may provide the plurality of pixels PX with the data voltages VD that are adjusted such that the driving transistors TDR may generate substantially the same driving current at the same gray level. For example, in case that a first pixel PX generates a relatively low sensing current in response to substantially the same sensing voltage VS and a second pixel PX generates a relatively high sensing current in response to substantially the same sensing voltage VS, the controller 160 may allow the driving transistors TDR of first and second pixels PX to generate substantially the same driving current at the same gray level by decreasing the data voltage VD for the first pixel PX and by increasing the data voltage VD for the second pixel PX (in case that the driving transistors TDR are PMOS transistors).

In some example embodiments, the scan driver 120 may apply the sensing pulse PSENSE to different scan lines of the plurality of scan lines SCANL1, SCANL2, . . . , SCANLN in different frame periods of a plurality of frame periods such that a sensing operation for all of the plurality of pixels PX is performed over the plurality of frame periods. For example, in order that the sensing operation for all of the plurality of pixels PX is performed over 10 frame periods, the scan driver 120 may apply the sensing pulse PSENSE to a first scan line, an eleventh scan line, etc. in a first frame period, may apply the sensing pulse PSENSE to a second scan line, an twelfth scan line, etc. in a first frame period, and, similarly, may apply the sensing pulse PSENSE to different scan lines in third through tenth frame periods. Accordingly, since not periods in which the sensing pulse PSENSE is applied to all scan lines SCANL1, SCANL2, SCANLN, but a period in which the sensing pulse PSENSE is applied to only a portion of the scan lines SCANL1, SCANL2, . . . , SCANLN is inserted in an active period of each frame period, a time of each frame period may not be excessively increased, and may be sufficient for the period to be inserted even in a high resolution display device.

In a related-art display device, in order for the driving transistors TDR of the plurality of pixels PX to have substantially the same hysteresis characteristic, each pixel PX may include an additional initialization transistor that applies an initialization voltage to the gate of the driving transistor TDR. However, this technique requires the additional initialization transistors, initialization lines and/or an initialization power supply, and thus may not be suitable for a high resolution display device.

However, as described above, in the display device 100 according to some example embodiments, the scan driver 120 may sequentially apply the sensing pulse PSENSE and the scan pulse PSCAN to at least one scan line of the plurality of scan lines SCANL1, SCANL2, . . . , SCANLN within the active period of each frame period, the sensing circuit 150 may measure the sensing currents generated by the plurality of pixels PX connected to the at least one scan line in response to the sensing voltages VS through the plurality of sensing lines SENSEL1, SENSEL2, . . . , SENSELM, and the controller 160 may adjust the data voltages VD for the plurality of pixels PX based on the sensing currents measured by the sensing circuit 150 such that the hysteresis characteristics of the driving transistors TDR of the plurality of pixels PX may be compensated. Accordingly, the display device 100 according to example embodiments may sense and compensate for the hysteresis characteristics of the driving transistors TDR without additional initialization transistors, lines and/or power supply. Further, the display device 100 according to example embodiments may perform the sensing operation for only the pixels PX connected to a portion of the plurality of scan lines SCANL1, SCANL2, . . . , SCANLN in each frame period such that the sensing operation for all of the plurality of pixels PX is performed over a plurality of frame periods, and thus a time of each frame period may not be excessively increased. Accordingly, even if the display device 100 is a high resolution display device, the time of each frame period may not be insufficient, and the hysteresis characteristics may be accurately sensed and compensated.

According to example embodiments, the scan driver 120, the data driver 130, the emission driver 140, the sensing circuit 150 and the controller 160 may be implemented with separate integrated circuits (ICs), or at least a portion thereof may be implemented with a single IC. In an example, the scan driver 120 and the emission driver 140 may be integrated directly on the display panel 110, and the data driver 130, the sensing circuit 150 and the controller 160 may be implemented as a single IC. However, the implementations of the scan driver 120, the data driver 130, the emission driver 140, the sensing circuit 150 and the controller 160 may not be limited to the example.

Figure 5:
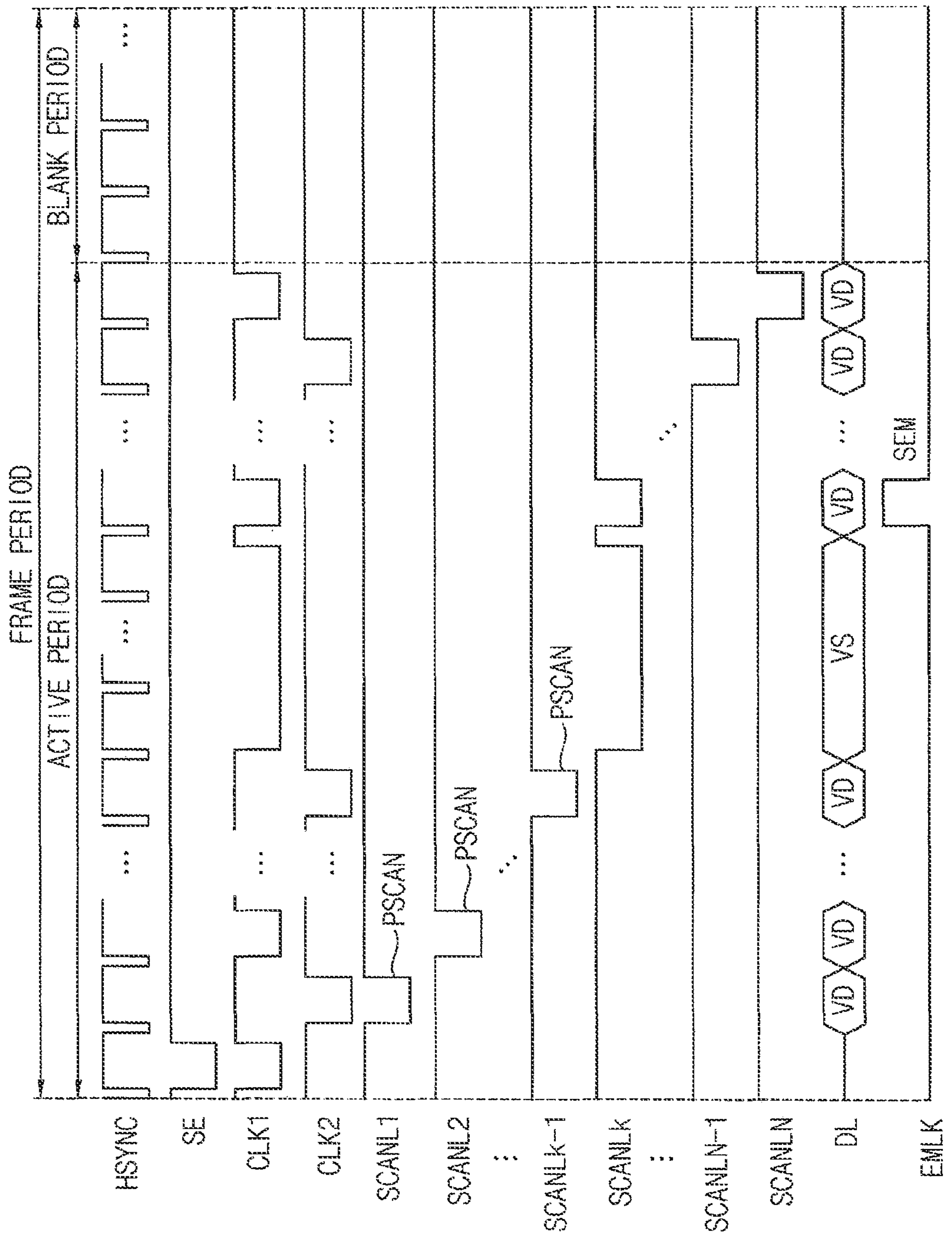
FIG. 5 is a timing diagram for describing an operation of a display device according to some example embodiments.
Figure 6A:
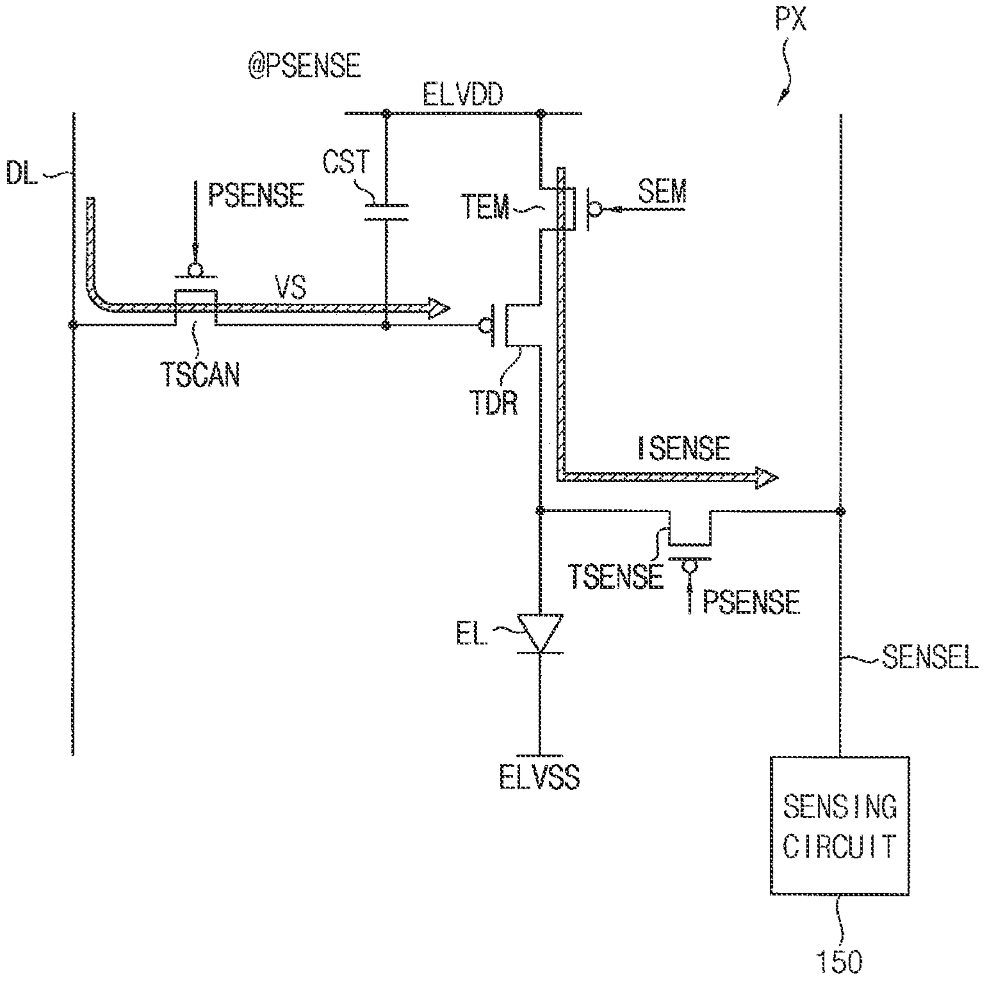
FIG. 6A is a diagram for describing an operation of a pixel when a sensing pulse is applied.
Figure 6B:
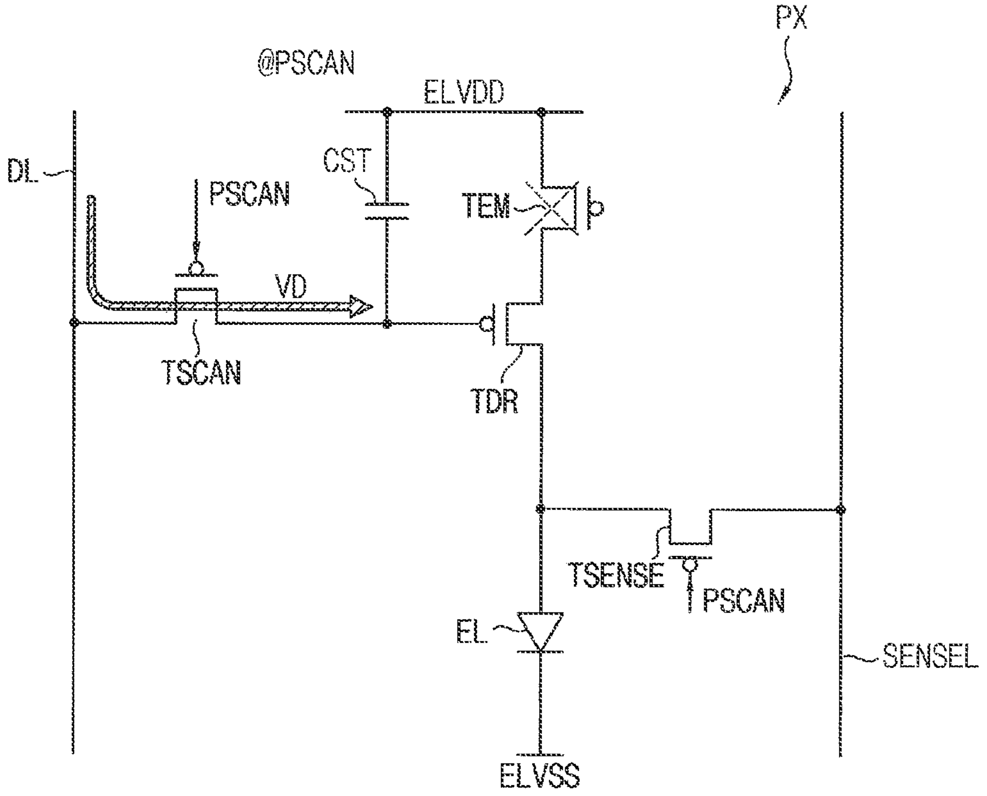
FIG. 6B is a diagram for describing an operation of a pixel when a scan pulse is applied.
Figure 6C:
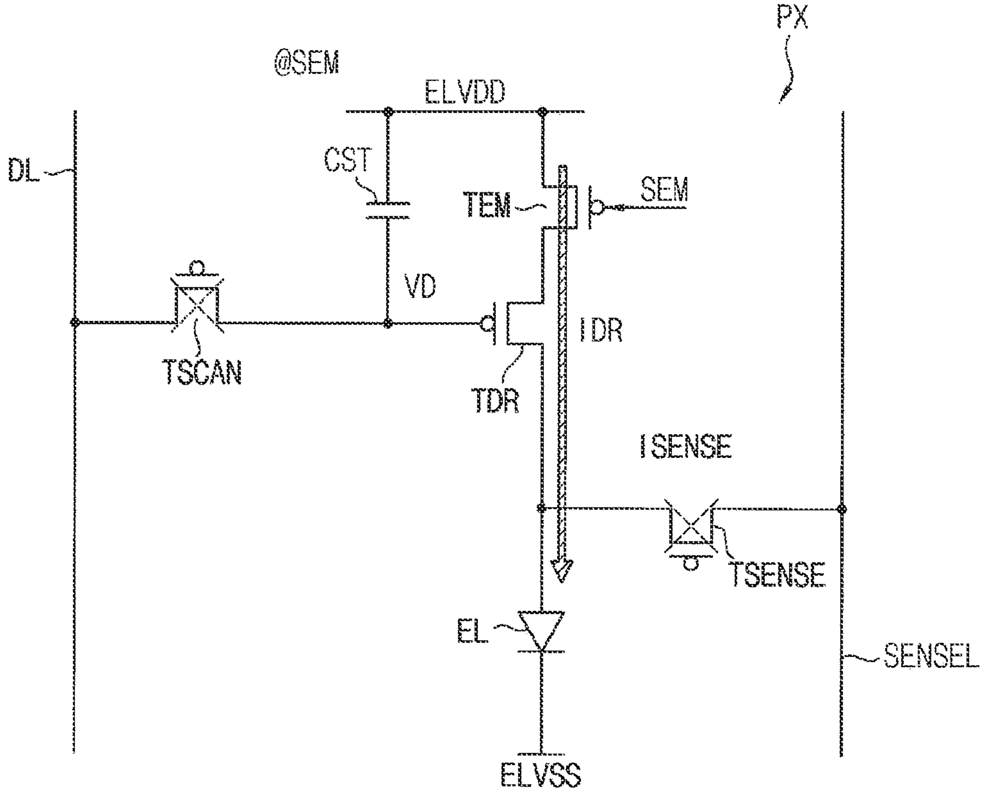
FIG. 6C is a diagram for describing an operation of a pixel when an emission control signal is applied.
Figure 7:
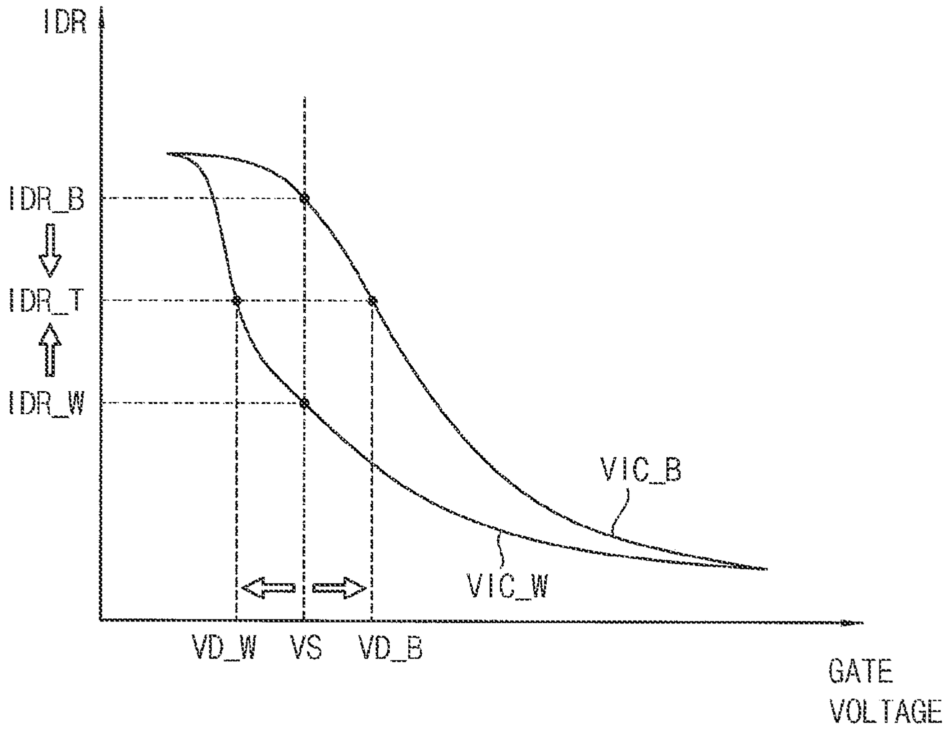
FIG. 7 is a diagram for describing an example where data voltages are adjusted to compensate for hysteresis characteristics of driving transistors in a display device according to some example embodiments.

FIG. 5 is a timing diagram for describing an operation of a display device according to example embodiments, FIG. 6A is a diagram for describing an operation of a pixel when a sensing pulse is applied, FIG. 6B is a diagram for describing an operation of a pixel when a scan pulse is applied, FIG. 6C is a diagram for describing an operation of a pixel when an emission control signal is applied, and FIG. 7 is a diagram for describing an example where data voltages are adjusted to compensate for hysteresis characteristics of driving transistors in a display device according to example embodiments.

Referring to FIGS. 1 and 5, each frame period of a display device 100 may include an active period in which refreshing the display device 100 is performed, and a blank period between adjacent active periods.

In the active period of each frame period, a controller 160 may provide a scan driver 120 with a scan enable signal SE, and first and second clock signals CLK1 and CLK2 having clock pulses at different time periods, and the scan driver 120 may output a scan pulse PSCAN to a plurality of scan lines SCANL1, SCANL2, . . . , SCANLk−1, SCANLk, . . . , SCANLN in synchronization with a horizontal synchronization signal HSYNC based on the scan enable signal SE and the first and second clock signals CLK1 and CLK2.

Further, in the active period of each frame period, the scan driver 120 may further output a sensing pulse PSENSE to at least one scan line SCANLk. For example, as illustrated in FIG. 5, the controller 160 may provide the second clock signal CLK2 having a clock pulse with a first pulse width to the scan driver 120 to apply the scan pulse PSCAN having the first pulse width to a (k−1)-th scan line SCANLk−1), then may provide the first clock signal CLK1 has a clock pulse with a second pulse width wider than the first pulse width to the scan driver 120 to apply the sensing pulse PSENSE having the second pulse width to a k-th scan line SCANLk, and then may provide again the first clock signal CLK1 having a clock pulse with the first pulse width to the scan driver 120 to apply the scan pulse PSCAN having the first pulse width to the k-th scan line SCANLk. After the scan pulse PSCAN is applied to the k-th scan line SCANLk, an emission driver 140 may apply an emission control signal SEM to a k-th emission control line EMLK corresponding to the k-th scan line SCANLk. A sensing operation for pixels PX connected to the k-th scan line SCANLk may be performed while the sensing pulse PSENSE is applied to the k-th scan line SCANLk, data voltages VD may be stored in the pixels PX connected to the k-th scan line SCANLk while the scan pulse PSCAN is applied to the k-th scan line SCANLk, and the pixels PX connected to the k-th scan line SCANLk may emit light while the emission control signal SEM is applied to the k-th emission control line EMLK after the scan pulse PSCAN is applied to the k-th scan line SCANLk.

For example, as illustrated in FIG. 6A, while the sensing pulse PSENSE is applied to a pixel PX, a scan transistor TSCAN and a sensing transistor TSENSE may be turned on in response to the sensing pulse PSENSE, and an emission control transistor TEM may be turned in response to the emission control signal SEM. Further, a data driver 130 may apply a sensing voltage VS to a data line DL, and the sensing voltage VS may be transferred to a driving transistor TDR through the scan transistor TSCAN. The driving transistor TDR may generate a sensing current ISENSE based on the sensing voltage VS transferred through the scan transistor TSCAN, the sensing transistor TSENSE may transfer the sensing current ISENSE generated by the driving transistor TDR to a sensing line SENSEL, and a sensing circuit 150 may measure the sensing current ISENSE through the sensing line SENSEL.

In some example embodiments, the sensing operation for all the pixels PX may be performed over a plurality of frame periods. Once the sensing currents ISENSE generated by the driving transistors TDR of all the pixels PX in response to the sensing voltage VS are measured, or hysteresis characteristics of the driving transistors TDR of all the pixels PX are detected, the controller 160 may adjust the data voltages VD for all the pixels PX.

For example, as illustrated in FIG. 7, a first driving transistor TDR of a first pixel PX that continuously receives a data voltage VD corresponding to the highest gray level in previous frame periods, or a white data voltage may have a first hysteresis characteristic, or a first voltage-current characteristic VIC_W, and a second driving transistor TDR of a second pixel PX that continuously receives a data voltage VD corresponding to the lowest gray level in the previous frame periods, or a black data voltage may have a second hysteresis characteristic, or a second voltage-current characteristic VIC_B.

Accordingly, although the same sensing voltage VS corresponding to the same gray level is applied to the first and second pixels PX, the first driving transistor TDR of the first pixel PX may generate a relatively low sensing current IDR_W, and the second driving transistor TDR of the second pixel PX may generate a relatively high sensing current IDR_B. The controller 160 may receive information about the sensing currents IDR_W and IDR_B of the first and second pixels PX from the sensing circuit 150, and may adjust the data voltages VD for the first and second pixels PX such that the driving transistors TDR of the first and second pixels PX may generate substantially the same current (e.g., a target current IDR_T corresponding to an intermediate value between the sensing currents IDR_W and IDR_B) at the same gray level. For example, the controller 160 may decrease (in a case that the driving transistor TDR is a PMOS transistor) the data voltage VD for the first pixel PX generating the relatively low sensing current IDR_W to a data voltage VD_W corresponding to the target current IDR_T, and may increase the data voltage VD for the second pixel PX generating the relatively high sensing current IDR_B to a data voltage VD_B corresponding to the target current IDR_T. Accordingly, regardless of the hysteresis characteristic VIC_W and VIC_B of the driving transistors TDR, all the pixels PX of the display device 100 may generate substantially the same driving current at the same gray level, and may emit light with substantially the same luminance.

As illustrated in FIG. 6B, while the scan pulse PSCAN is applied to the pixel PX, the scan transistor TSCAN and the sensing transistor TSENSE may be turned on, and the emission control transistor TEM may be turned off. Further, the data driver 130 may apply, to the data line DL, the data voltage VD that is adjusted such that the hysteresis characteristic VIC_W and VIC_B of the driving transistors TDR may be compensated. The scan transistor TSCAN may transfer the data voltage VD of the data line DL to a storage capacitor CST, and the storage capacitor CST may store the data voltage VD transferred through the scan transistor TSCAN.

Further, as illustrated in FIG. 6C, while the emission control signal SEM is applied after the scan pulse PSCAN is applied to the pixel PX, the scan transistor TSCAN and the sensing transistor TSENSE may be turned off, and the emission control transistor TEM may be turned on. The driving transistor TDR may generate a driving current IDR based on the data voltage VD stored in the storage capacitor CST, or the data voltage VD that is adjusted such that the hysteresis characteristic VIC_W and VIC_B of the driving transistors TDR may be compensated. An OLED EL may emit light based on the driving current IDR generated by the driving transistor TDR. As described above, since each pixel PX emits light based on the data voltage VD that is adjusted such that the hysteresis characteristic VIC_W and VIC_B of the driving transistors TDR may be compensated, all the pixels PX of the display device 100 may emit light with substantially the same luminance at the same gray level.

Figure 8:
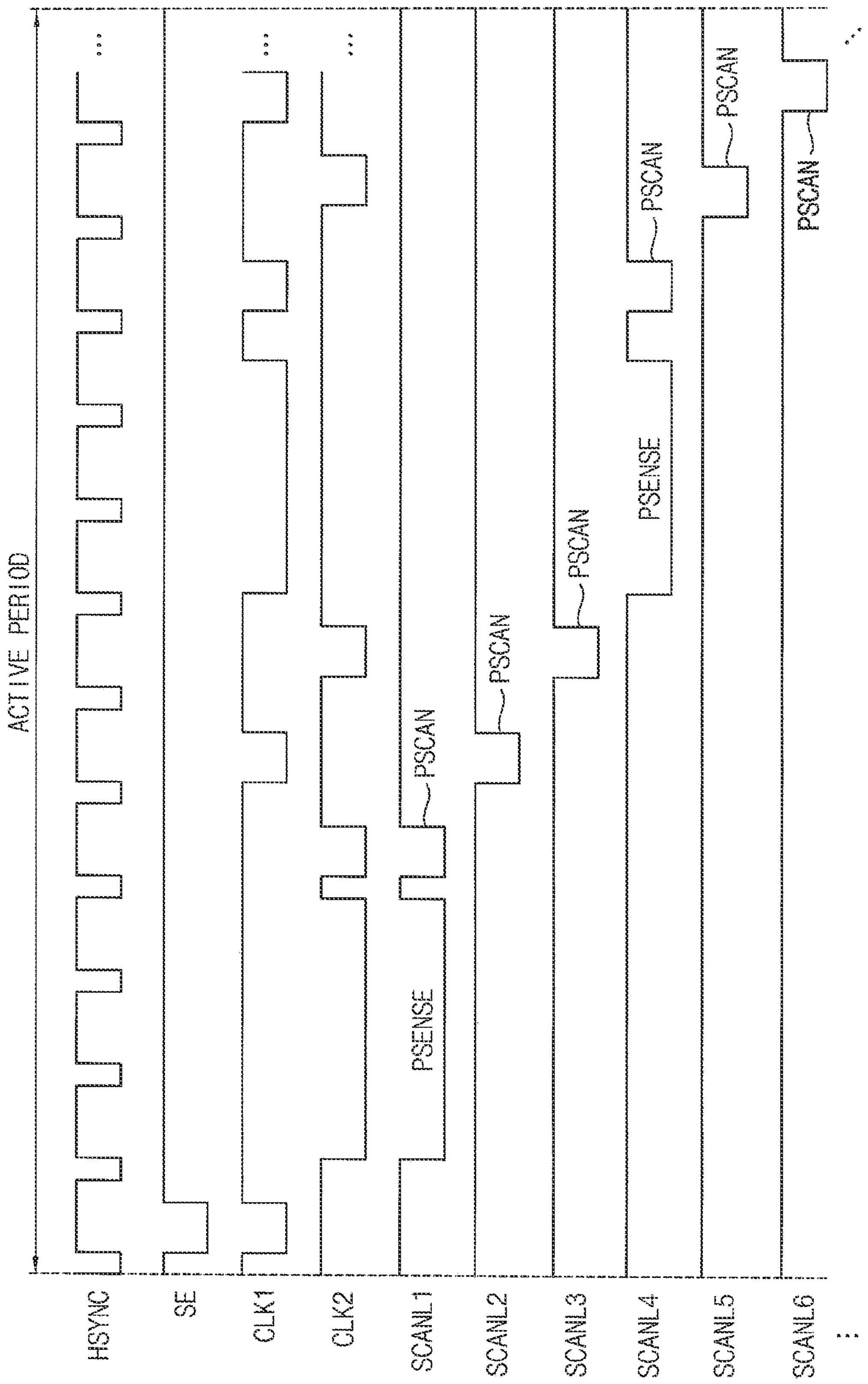
FIG. 8 is a timing diagram for describing an operation of a display device according to some example embodiments.
Figure 9A:
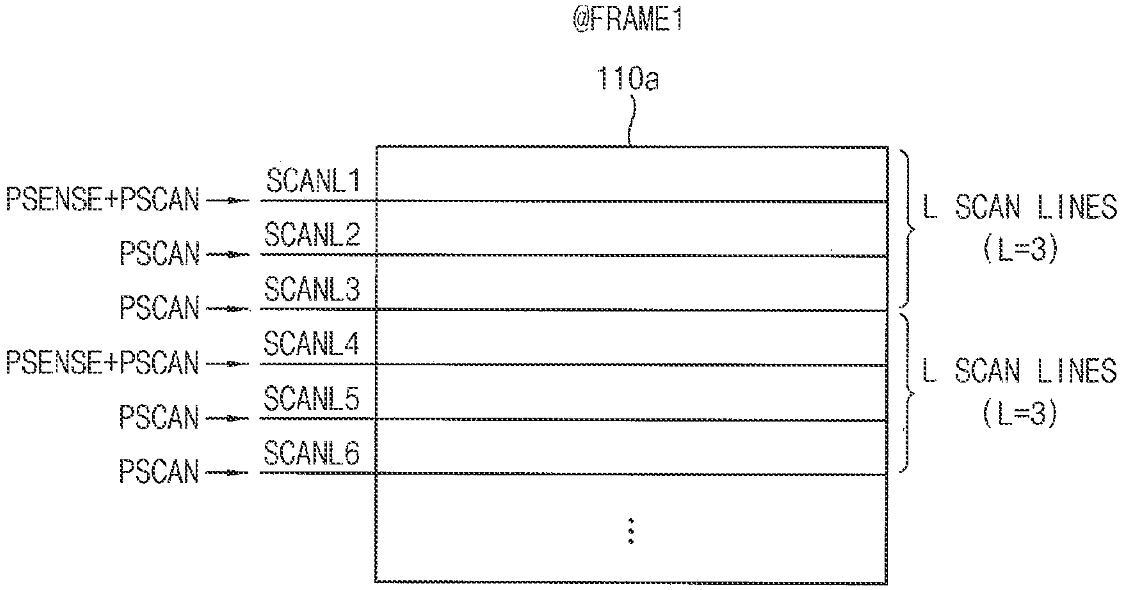
FIGS. 9A through 9C are diagrams for describing an operation of a display device in a plurality of frame periods according to some example embodiments.
Figure 9B:
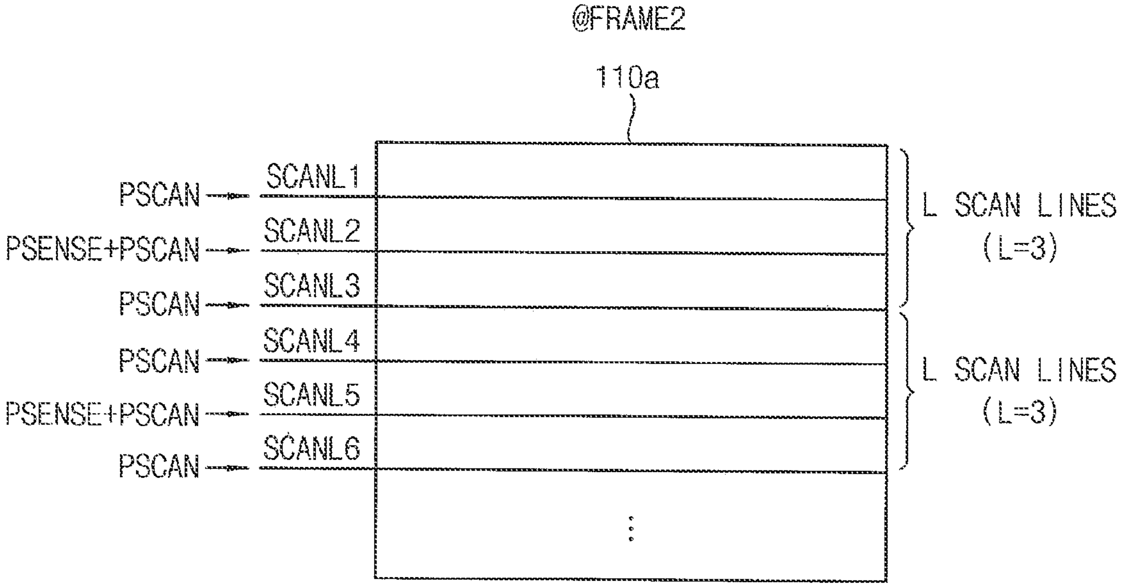
Figure 9C:
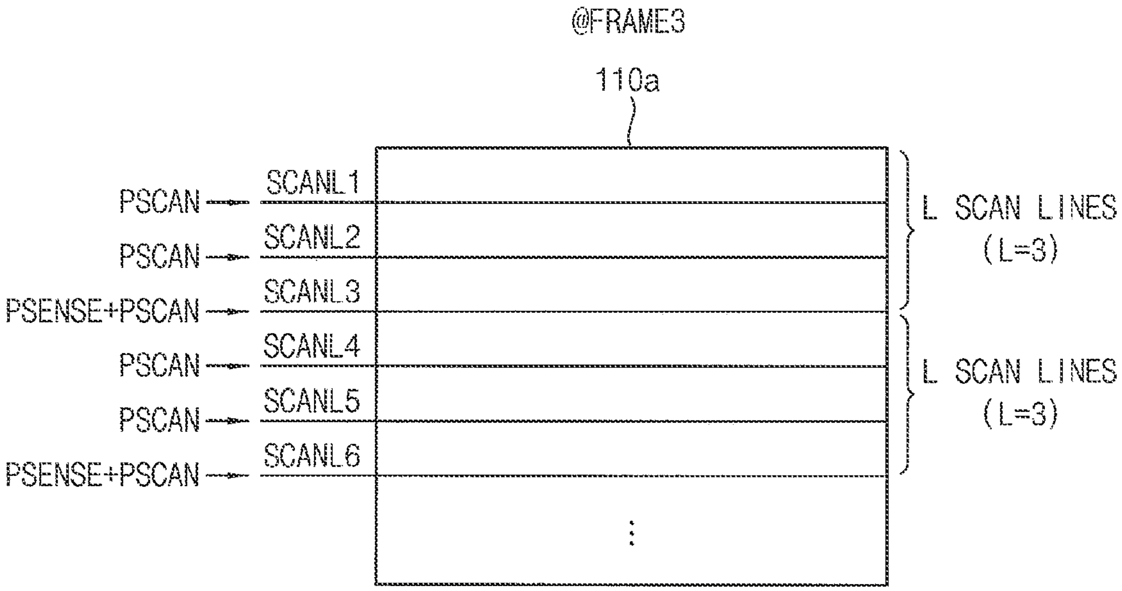

FIG. 8 is a timing diagram for describing an operation of a display device according to example embodiments, and FIGS. 9A through 9C are diagrams for describing an operation of a display device in a plurality of frame periods according to example embodiments.

Referring to FIGS. 1 and 8, in an active period of each frame period, a scan driver 120 of a display device 100 according to example embodiments may sequentially apply a sensing pulse PSENSE and a scan pulse PSCAN to one scan line (e.g., SCANL1) per successive L scan lines (e.g., SCANL1, SCANL2 and SCANL3) among a plurality of scan lines SCANL1, SCANL2, SCANL3, SCANL4, SCANL5 and SCANL6, where L is an integer greater than 1. For example, embodiments, as illustrated in FIG. 8, the scan driver 120 may apply the sensing pulse PSENSE to one scan line (e.g., SCANL1) per successive three scan lines (e.g., SCANL1, SCANL2 and SCANL3) in each frame period. As described above, in the display device 100 according to example embodiments, since, in the active period of each frame period, the sensing pulse PSENSE is applied to not all the scan lines SCANL1, SCANL2, SCANL3, SCANL4, SCANL5 and SCANL6, but a portion SCANL1 and SCANL4 of the scan lines SCANL1, SCANL2, SCANL3, SCANL4, SCANL5 and SCANL6, a time of each frame period may not be insufficient even if the display device 100 is a high resolution display device.

In some example embodiments, the scan driver 120 may apply the sensing pulse PSENSE to different scan lines among the L scan lines in different frame periods such that a sensing operation for all the pixels PX is performed over L frame periods. For example, as illustrated in FIGS. 9A through 9C, the scan driver 120 may apply the sensing pulse PSENSE to a first scan line SCANL1, a fourth scan line SCANL4, etc. of a display panel 110*a* in a first frame period FRAME1, may apply the sensing pulse PSENSE to a second scan line SCANL2, a fifth scan line SCANL5, etc. of the display panel 110*a* in a second frame period FRAME2, and may apply the sensing pulse PSENSE to a third scan line SCANL3, a sixth scan line SCANL6, etc. of the display panel 110*a* in a third frame period FRAME3. Accordingly, the sensing operation for all the pixels PX may be performed over three frame periods FRAME1, FRAME2 and FRAME3.

Figure 10:
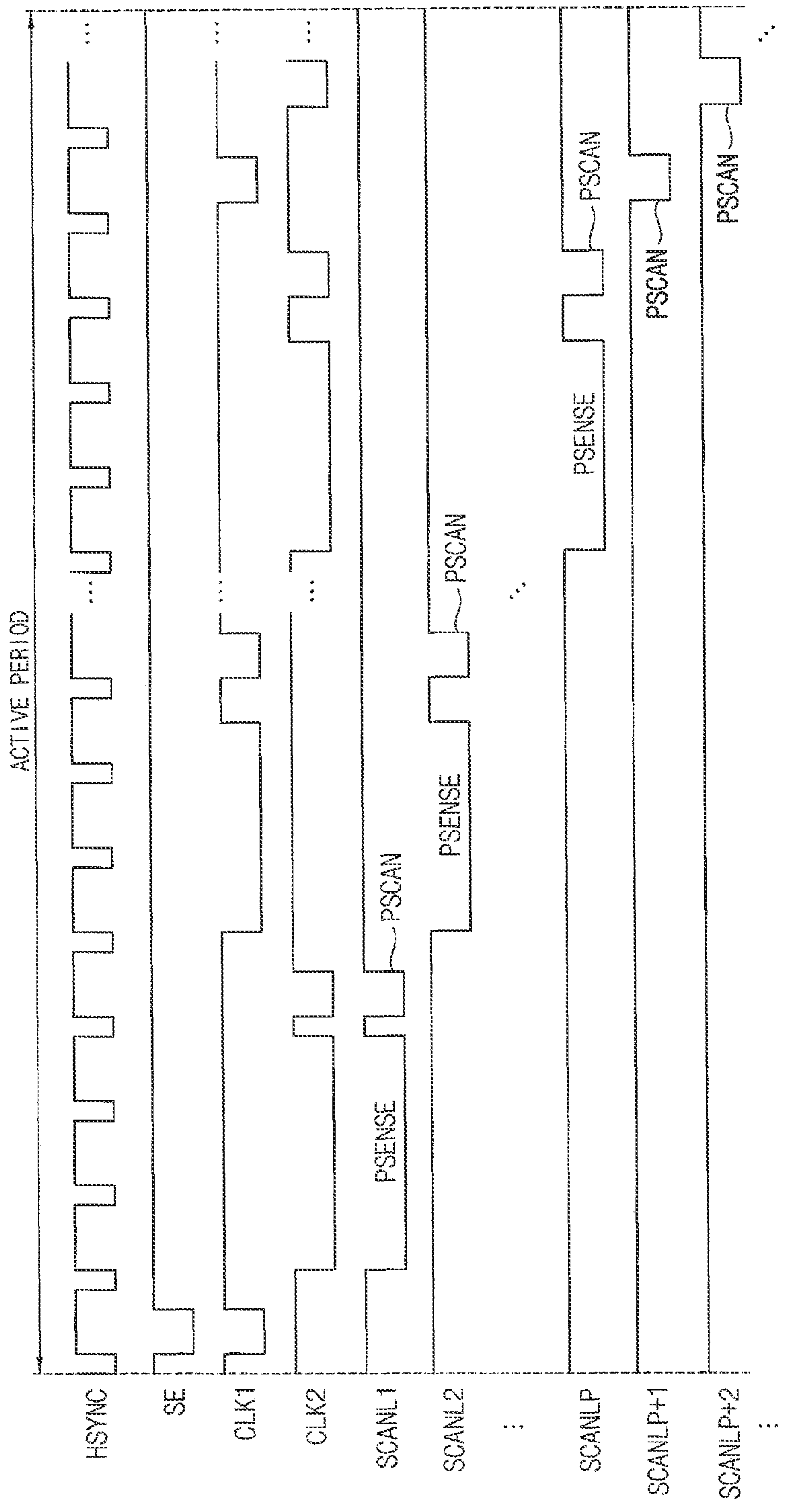
FIG. 10 is a timing diagram for describing an operation of a display device according to some example embodiments.
Figure 11A:
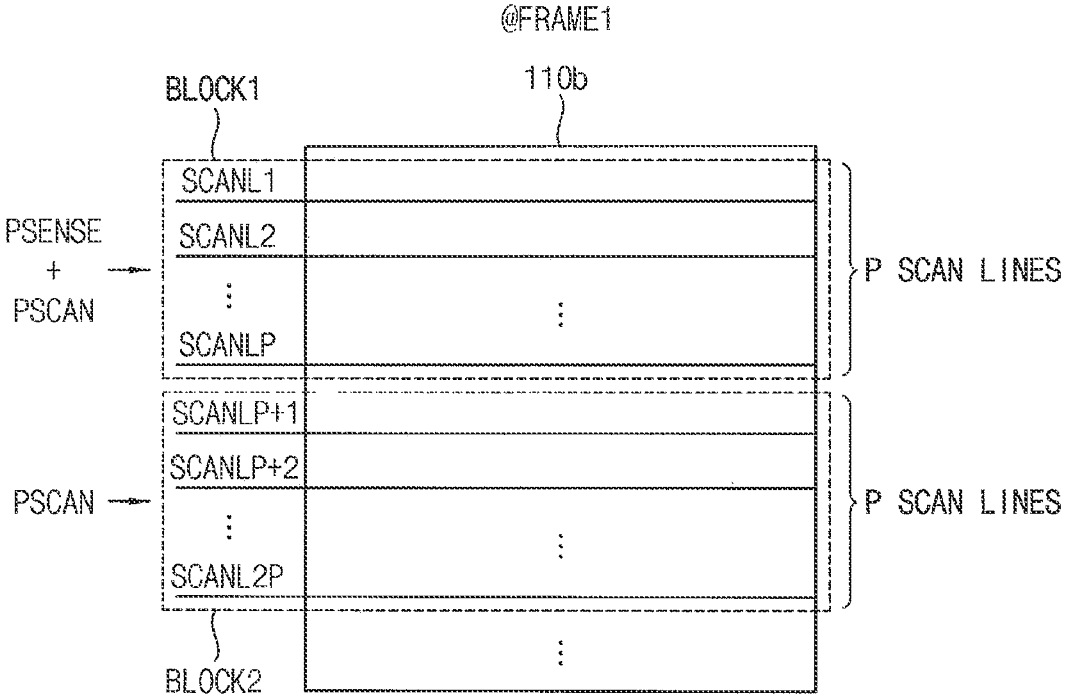
FIGS. 11A and 11B are diagrams for describing an operation of a display device in a plurality of frame periods according to some example embodiments.
Figure 11B:
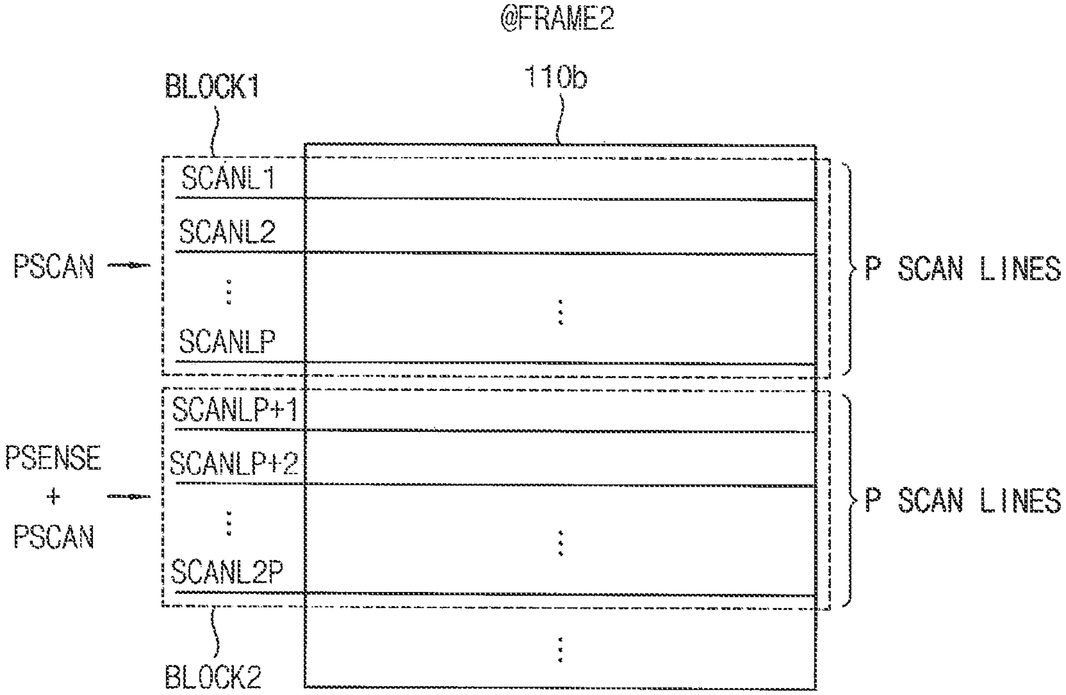

FIG. 10 is a timing diagram for describing an operation of a display device according to example embodiments, and FIGS. 11A and 11B are diagrams for describing an operation of a display device in a plurality of frame periods according to some example embodiments.

Referring to FIGS. 1, 10, 11A, and 11B, in a display device 100 according to some example embodiments, a plurality of scan lines SCANL1, SCANL2, SCANLP, SCANLP+1 and SCANLP+2 may be grouped into a plurality of blocks BLOCK1 and BLOCK2 each including successive P scan lines (e.g., SCANL1 through SCANLP), where P is an integer greater than 1. In an active period of each frame period, a scan driver 120 may apply a sensing pulse PSENSE to the P scan lines (e.g., SCANL1 through SCANLP) included in one (e.g., BLOCK1) of the plurality of blocks BLOCK1 and BLOCK2. Accordingly, in the display device 100 according to example embodiments, since the sensing pulse PSENSE is applied only to the P scan lines (e.g., SCANL1 through SCANLP) included in one block (e.g., BLOCK1), a time of each frame period may not be insufficient even if the display device 100 is a high resolution display device.

In some example embodiments, the scan driver 120 may apply the sensing pulse PSENSE to different blocks of the plurality of blocks BLOCK1 and BLOCK2 in different frame periods of a plurality of frame periods such that a sensing operation for all the pixels PX may be performed over the plurality of frame periods. For example, as illustrated in FIGS. 11A and 11B, the plurality of scan lines SCANL1, SCANL2, SCANLP, SCANLP+1 and SCANLP+2 of a display panel 110*b* may be grouped into the plurality of blocks BLOCK1 and BLOCK2 each including successive P scan lines (e.g., SCANL1 through SCANLP), the scan driver 120 may apply the sensing pulse PSENSE to the P scan lines SCANL1 through SCANLP in a first block BLOCK1 in a first frame period FRAME1, and may apply the sensing pulse PSENSE to the P scan lines SCANLP+1 through SCANL2P in a second block BLOCK2 different from the first block BLOCK1 in a second frame period FRAME2.

Figure 12:
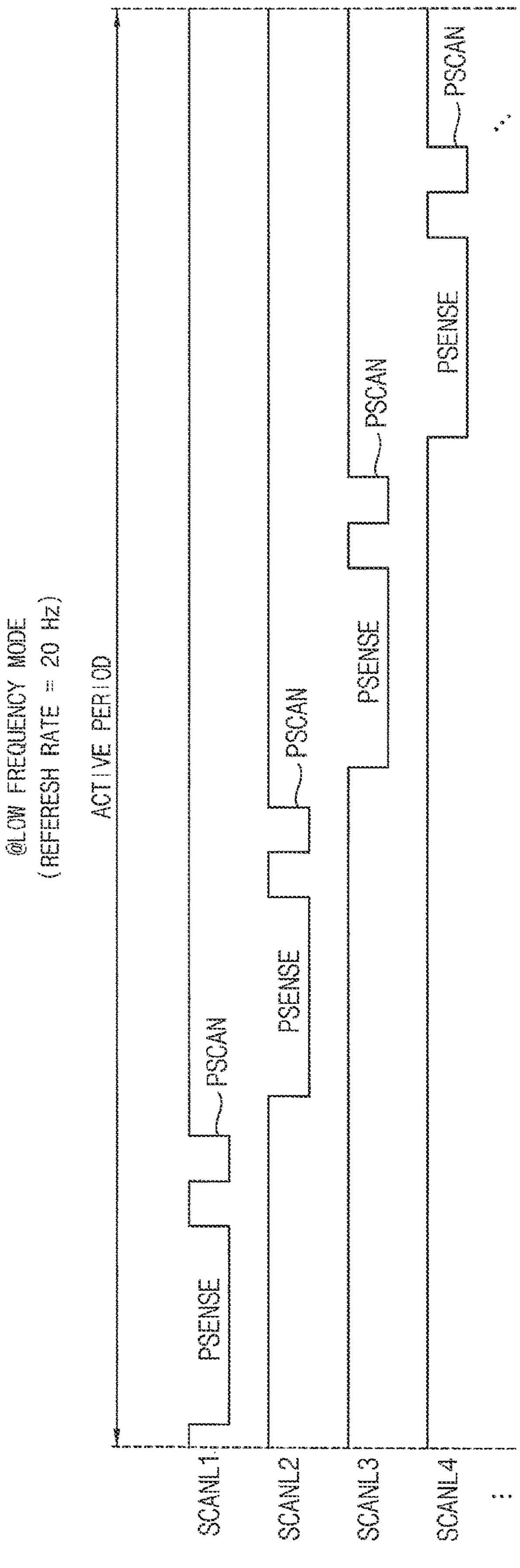
FIG. 12 is a timing diagram for describing an operation of a display device according to some example embodiments.

FIG. 12 is a timing diagram for describing an operation of a display device according to example embodiments.

Referring to FIGS. 1, 8 and 12, in a display device 100 according to example embodiments, a scan driver 120 may apply a sensing pulse PSENSE to one scan line (e.g., SCANL1) per L scan lines (e.g., SCANL1, SCANL2 and SCANL3) as illustrated in FIG. 8 in a normal mode where the display device 100 operates at a first refresh rate (e.g., about 60 Hz), and may apply the sensing pulse PSENSE to all the scan lines SCANL1, SCANL2, SCANL3 and SCANL4 in a low frequency mode where the display device 100 operates at a second refresh rate (e.g., about 20 Hz) lower than the first refresh rate. As described above, in the display device 100 according to example embodiments, in the low frequency mode where each frame period has a sufficient time, a sensing operation for all the pixels PX included in a display panel 110 may be performed in each frame period.

Figure 13:
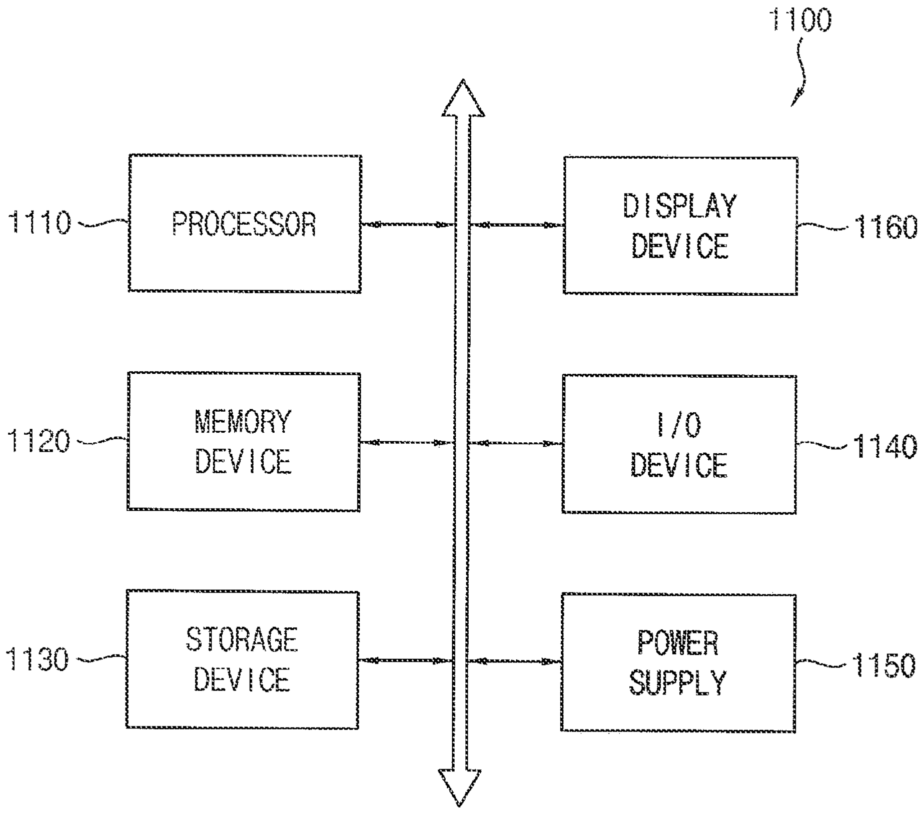
FIG. 13 is a block diagram illustrating an electronic device including a display device according to some example embodiments.

FIG. 13 is a block diagram illustrating an electronic device including a display device according to example embodiments.

Referring to FIG. 13, an electronic device 1100 may include a processor 1110, a memory device 1120, a storage device 1130, an input/output (I/O) device 1140, a power supply 1150, and a display device 1160. The electronic device 1100 may further include a plurality of ports for communicating a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. Further, in some example embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100.

In the display device 1160, a scan driver may sequentially apply a sensing pulse and a scan pulse to at least one or a portion of scan lines in an active period of each frame period, and thus hysteresis characteristics of driving transistors may be accurately sensed and compensated without additional initialization transistors, lines and/or power supply.

In some example embodiments, the electronic device 1100 be any electronic device including the display device 1160, such as a cellular phone, a smart phone, a tablet computer, a wearable device, a virtual reality (VR) device, a personal digital assistant (PDA), a portable multimedia player (PMP), a digital camera, a music player, a portable game console, a navigation system, a digital television, a 3D television, a personal computer (PC), a home appliance, a laptop computer, etc.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a chip on film (COF), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

The foregoing is illustrative of some example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims, and their equivalents.

What is claimed is:

1. A display device comprising:

a display panel including a plurality of pixels;

a scan driver connected to the plurality of pixels through a plurality of scan lines;

a sensing circuit connected to the plurality of pixels through a plurality of sensing lines; and a controller configured to control the scan driver and the sensing circuit, wherein, in an active period of each frame period, the scan driver is configured to sequentially apply a sensing pulse and a scan pulse to a same scan line of the plurality of scan lines, wherein the active period is a period in which data voltages corresponding to image data are provided to the plurality of pixels, and wherein a pulse width of the sensing pulse is different from a pulse width of the scan pulse.

2. The display device of claim 1, wherein the pulse width of the sensing pulse is wider than the pulse width of the scan pulse.

3. The display device of claim 1, wherein, after the scan pulse is applied to a previous scan line that is directly previous to the scan line among the plurality of scan lines, and before the scan pulse is applied to the scan line, the scan driver applies the sensing pulse to the scan line.

4. The display device of claim 3, wherein the controller is configured to provide the scan driver with first and second clock signals having clock pulses at different time periods, wherein, when the scan driver is configured to apply the scan pulse to the previous scan line, a first one of the first and second clock signals has a clock pulse having a first pulse width, wherein, when the scan driver is configured to apply the sensing pulse to the scan line, a second one of the first and second clock signals has a clock pulse having a second pulse width wider than the first pulse width, and wherein, when the scan driver is configured to apply the scan pulse to the scan line, the second one of the first and second clock signals has a clock pulse having the first pulse width.

5. The display device of claim 1, wherein the scan driver is configured to apply the sensing pulse to different scan lines of the plurality of scan lines in different frame periods of a plurality of frame periods such that a sensing operation for all of the plurality of pixels is performed over the plurality of frame periods.

6. The display device of claim 1, further comprising:

a data driver connected to the plurality of pixels through a plurality of data lines, wherein the data driver is configured to apply data voltages to the plurality of data lines when the scan driver outputs the scan pulse, and to apply the sensing voltages to the plurality of data lines when the scan driver outputs the sensing pulse.

7. The display device of claim 6, wherein the controller is configured to adjust the data voltages for the plurality of pixels based on the hysteresis characteristics detected by the sensing circuit.

8. The display device of claim 1, wherein the scan driver includes a plurality of stages that apply the scan pulse or the sensing pulse as a scan signal to the plurality of scan lines, respectively.

9. The display device of claim 8, wherein each of the plurality of stages includes:

a first transistor configured to transfer a previous scan signal to a first node in response to a first clock signal;

a second transistor configured to transfer a high gate voltage to a third node in response to a voltage of a second node;

a third transistor configured to transfer a voltage of the third node to the first node in response to a second clock signal;

a fourth transistor configured to transfer the first clock signal to the second node in response to a voltage of the first node;

a fifth transistor configured to transfer a low gate voltage to the second node in response to the first clock signal;

a sixth transistor configured to output the high gate voltage as the scan signal to a scan output node in response to the voltage of the second node;

a seventh transistor configured to output the second clock signal as the scan signal to the scan output node in response to the voltage of the first node;

a first capacitor connected between a line of the high gate voltage and the second node; and a second capacitor connected between the first node and the scan output node.

10. The display device of claim 1, wherein each of the plurality of pixels includes:

a scan transistor having a gate connected to a corresponding one of the plurality of scan lines, a source connected to a data line, and a drain;

a storage capacitor having a first electrode connected to the drain of the scan transistor, and a second electrode connected to a line of a first power supply voltage;

a driving transistor having a gate connected to the drain of the scan transistor and the first electrode of the storage capacitor, a source, and a drain;

an emission control transistor having a gate connected to an emission control line, a source connected to the line of the first power supply voltage, and a drain connected to the source of the driving transistor;

an organic light emitting diode having an anode connected to the drain of the driving transistor, and a cathode connected to a line of a second power supply voltage; and a sensing transistor having a gate connected to the corresponding one of the plurality of scan lines, a source connected to the drain of the driving transistor, and a drain connected to a corresponding one of the plurality of sensing lines.

11. The display device of claim 10, wherein, while the sensing pulse is applied, the scan transistor, the sensing transistor and the emission control transistor are configured to be turned on, the driving transistor is configured to generate a sensing current based on a sensing voltage transferred through the scan transistor, and the sensing transistor is configured to transfer the sensing current generated by the driving transistor to the corresponding one of the plurality of sensing lines.

12. The display device of claim 10, wherein, while the scan pulse is applied, the scan transistor and the sensing transistor are configured to be turned on, the emission control transistor is configured to be turned off, and the storage capacitor is configured to store a data voltage transferred through the scan transistor.

13. The display device of claim 12, wherein, after the scan pulse is applied, the scan transistor and the sensing transistor are configured to be turned off, the emission control transistor is configured to be turned on, the driving transistor is configured to generate a driving current based on the data voltage stored in the storage capacitor, and the organic light emitting diode is configured to emit light based on the driving current generated by the driving transistor.

14. The display device of claim 1, wherein, in each frame period, the scan driver is configured to apply the sensing pulse to one scan line per successive L scan lines among the plurality of scan lines, where L is an integer greater than 1.

15. The display device of claim 14, wherein the scan driver is configured to apply the sensing pulse to different scan lines among the L scan lines in different frame periods such that a sensing operation for all of the plurality of pixels is performed over L frame periods.

16. The display device of claim 1, wherein the plurality of scan lines are grouped into a plurality of blocks each including successive P scan lines, where P is an integer greater than 1, and wherein, in each frame period, the scan driver is configured to apply the sensing pulse to the P scan lines included in one of the plurality of blocks.

17. The display device of claim 16, wherein the scan driver is configured to apply the sensing pulse to different blocks of the plurality of blocks in different frame periods of a plurality of frame periods such that a sensing operation for all of the plurality of pixels is performed over the plurality of frame periods.

18. The display device of claim 1, wherein the scan driver is configured to apply the sensing pulse to the at scan line in a normal mode corresponding to a first refresh rate, and to apply the sensing pulse to all of the plurality of scan lines in a low frequency mode corresponding to a second refresh rate lower than the first refresh rate.

19. A display device comprising:

a display panel including a plurality of pixels;

a scan driver connected to the plurality of pixels through a plurality of scan lines;

a data driver connected to the plurality of pixels through a plurality of data lines;

an emission driver connected to the plurality of pixels through a plurality of emission control lines;

a sensing circuit connected to the plurality of pixels through a plurality of sensing lines; and a controller configured to control the scan driver, the data driver, the emission driver and the sensing circuit, wherein, in an active period of each frame period, the scan driver is configured to sequentially apply a sensing pulse and a scan pulse to a same scan line of the plurality of scan lines, wherein the active period is a period in which data voltages corresponding to image data are provided to the plurality of pixels, and wherein a pulse width of the sensing pulse is different from a pulse width of the scan pulse.

* * * * *